United States Patent [19]
Patel

[11] Patent Number: 6,136,732
[45] Date of Patent: Oct. 24, 2000

[54] ADHESIVE COMPOSITION COMPRISING A POWDER IMPREGNATED NON-WOVEN WEB, COMPOSITE ARTICLES CONTAINING SAID ADHESIVE, AND PROCESSES FOR MAKING THE SAME

[75] Inventor: Tushar Patel, Mt. Clemens, Mich.

[73] Assignee: E.R Technologies, Madison Heights, Mich.

[21] Appl. No.: 09/137,124

[22] Filed: Aug. 20, 1998

[51] Int. Cl.[7] ........................................ B32B 7/12
[52] U.S. Cl. .................. 442/149; 442/150; 428/355 R; 428/355 EP; 428/402
[58] Field of Search .................... 442/150, 149; 428/346, 347, 349, 355 R, 355 EP, 402

[56] References Cited

U.S. PATENT DOCUMENTS

| | | | |
|---|---|---|---|
| 3,501,368 | 3/1970 | Schabert et al. | 442/150 X |
| 4,707,388 | 11/1987 | Park et al. | 428/347 X |
| 5,405,686 | 4/1995 | Portelli et al. | 442/149 |
| 5,543,214 | 8/1996 | Groshens et al. | 442/150 X |
| 5,702,991 | 12/1997 | Jacobs | 442/149 X |

*Primary Examiner*—Daniel Zirker
*Attorney, Agent, or Firm*—Dorsey & Whitney, LLP

[57] ABSTRACT

An adhesive composition comprising a thermosetting powder adhesive adhered to a thermoplastic non-woven web adhesive, and processes for making the same. The thermosetting powder adhesive component is preferably a polyester, a polyester-polyurethane, an epoxy or an epoxy-polyester hybrid. The thermoplastic non-woven web adhesive component is preferably an ethylene-vinyl acetate copolymer, a polyester, a polyolefin, or a polyamide. The adhesive composition provides superior bonding between vinyl and/or cloth coverings and a variety of surfaces including metal, plastic, rubber and wood. There is also disclosed herein a composite article that comprises an adhesive layer made from the aforementioned adhesive composition and a substrate layer, and processes for making the same.

6 Claims, 5 Drawing Sheets

FIG. 5 ns ADHESIVE COMPOSITION COMPRISING A POWDER IMPREGNATED NON-WOVEN WEB, COMPOSITE ARTICLES CONTAINING SAID ADHESIVE, AND PROCESSES FOR MAKING THE SAME

BACKGROUND OF THE INVENTION

1. Field of the Invention

The instant invention relates to adhesives, composite articles containing adhesives, and processes of making the same. More particularly, the instant invention relates to an adhesive composition comprising a thermosetting powder adhesive adhered to a two-stage thermoplastic non-woven web adhesive, composite articles containing said adhesive, and processes of making the same.

2. Prior Art Description

Cloth and/or vinyl coverings are used in a number of industries, notably the automotive industry, as protective and decorative outer surface materials. For example, internal automotive parts including seats, dashboards, and door panels are generally covered with a cloth and/or vinyl covering. However, the covering is not naturally adherent to the metal, plastic, rubber and/or wood application surfaces. Therefore, an intermediate layer of adhesive is used to bind the covering to the application surfaces.

A wide variety of adhesives have been employed as the intermediate binding layer. These adhesives include thermoplastic powders, films, webs, and hot melt adhesives, as well as thermosetting water based and solvent based liquid adhesives. Unfortunately, every adhesive employed to date comes with its own unique set of problems. For example, thermoplastic powders, films, webs and hot melts must be applied in accordance with very restrictive time and temperature parameters and yield poor heat resistance. In addition, liquid adhesives require the use of bulky and expensive spraying equipment, and related cleaning and overspray disposal systems, for effective application.

More importantly, many of the adhesives employed to date exhibit premature bond failure. After several years the bond formed by the adhesive fails. This causes the covering to peel and results in an unsightly product that must either be patched or replaced. In the automotive industry this is a huge problem because the average life span of a car generally exceeds the life span of the adhesive. There is, therefore, a great need in the automotive art for a commercially viable adhesive that exhibits superior bond strength.

Such an adhesive would have use in any art wherein two incompatible materials need to be bonded. For example, such an adhesive could be used in combination with stiching to connect two portions of a cloth garment.

SUMMARY OF THE INVENTION

The instant invention provides an adhesive with superior bond strength, heat resistance, compatibility and processability. The adhesive comprises a thermosetting powder adhesive that is adhered to a thermoplastic non-woven web adhesive. The adhesive is prepared by contacting the powder adhesive and the web adhesive and then laminating the two adhesives together by applying heat and, optionally, pressure.

In addition, the instant invention provides a composite article comprising a substrate layer, such as vinyl or cloth, and an adhesive layer comprising the aforementioned adhesive composition. The composite article is made by laminating one or more thermoplastic non-woven web adhesives onto a substrate and then contacting a thermoplastic powder adhesive to the laminated web adhesive(s) The resulting product is then laminated together by applying heat and, optionally, pressure.

Using the instant invention, vinyl, cloth and a variety of other materials are more effectively bonded to each other and to metal, plastic, rubber, wood and a variety of other surfaces. In the automotive industry, this means that a customer can buy a car with the full expectation that the protective and decorative interior coverings will not peel during the car's lifetime. In the clothing industry, this means that the stiching used to connect different portions of a cloth garment can be more effectively reinforced. These and other features and advantages of the invention are described in, or are apparent from, the following detailed description of the preferred embodiments.

BRIEF DESCRIPTION OF THE DRAWINGS

The preferred embodiments of the invention will be described in detail with reference to the following figures, wherein like numerals refer to like elements, and wherein.

DETAILED DESCRIPTION OF THE INVENTION

I. Adhesive Composition and Process of Making the Same

An adhesive composition has been developed that can be packaged and sold for use in binding two otherwise incompatible materials. The word "incompatible," as used in this application, means that the materials do not naturally adhere to one another. Conversely, the word "compatible," as used in this application, means that the materials naturally adhere to one another. The adhesive composition comprises a thermosetting powder adhesive component that is adhered to a thermoplastic nonwoven web adhesive component.

The thermosetting powder adhesive component is not particularly limited. Any of the many thermosetting powder adhesives known in the art may be employed including, but not limited to, polyesters, polyester-polyurethanes, epoxies, and epoxy-polyester hybrids. Most preferably, the powder adhesive is a polyester-polyurethane such as Purbond™ HCM VN 555 and HCM VN 559, which are commercially available products made by Collano.

The thermoplastic non-woven web adhesive component is also not particularly limited. Any of the many thermoplastic non-woven "hot-melt" web adhesives known in the art may be employed. Typical hot-melt adhesives include, but are not limited to, ethylene-vinylacetate copolymers (EVAs), polyesters, polyolefins such as polyethylene, and polyamides such as nylon copolymers. The choice of web adhesive depends mainly on the materials to be bonded. For example, an ethylene-vinyl acetate web is superior for bonding vinyl to wood, but a polyester or polyamide web is superior for bonding vinyl to acrylonitrile-butadiene-styrene (ABS) rubber. The most versatile web adhesives are nylon copolymers such as PA-1001 which is commercially available from Spunfab Adhesive Products. Preferably, the web adhesive is in the form of a sheet that can be processed according to typical large scale manufacturing processes such as belt lamination. Alternatively, the web can be in the form of a slitted film. Such films contain 2 to 3 mil. slits that open up to form a perforated web upon heating.

The combination of a thermosetting powder adhesive and thermoplastic web adhesive to form an adhesive composition provides many advantages over the prior art. For example, the inventive adhesive composition exhibits superior bond strength. In fact, the bond strength provided by the instant adhesive composition is often so high that it exceeds the structural failure point of one or both of the bonded substrates. This is especially true in applications where cloth and/or vinyl are bonded to either ABS rubber or wood panels. In addition, the instant adhesive composition provides higher heat resistance than that obtained using conventional adhesives. The adhesive composition generally exhibits a heat resistance as high as 400° C. The combination of a thermoplastic and thermosetting adhesive also increases the adhesive composition's substrate compatibility and versatility as compared to single component thermosetting adhesives. This is because the thermoplastic component are often compatible with substrates that are generally incompatible with thermosetting adhesives. Finally, the adhesive is easy to process—requiring no treatment steps beyond the initial application of heat and pressure. Thus, products formed from substrates bonded with the instant adhesive can be demolded faster than products formed from substrates bonded with conventional adhesives.

The adhesive composition is easily produced by first contacting the two primary components, namely the thermoplastic non-woven web adhesive and the thermosetting powder adhesive, to form an intermediate product. For example, the powder adhesive may be sprinkled onto an exposed surface of the web adhesive. This causes the powder adhesive to sit loosely on top of the application surface. In addition, because of the open nature of the web adhesive, the powder adhesive thoroughly penetrates the fibers of the web adhesive. In fact, some of the powder adhesive will fall through the gaps in the web adhesive.

In a belt lamination process, the powder that falls through the web adhesive coats the underlying revolving belt used to guide the web adhesive through the laminator. When the coated belt returns to guide another section of web adhesive through the laminator, the powder adhesive on the surface of the belt will contact, and adhere to, the underside of the web adhesive. Thus, although powder adhesive may be applied to only one side of the web adhesive during belt lamination, both the front and back surfaces of the web adhesive become coated with powder adhesive.

Next, the resultant intermediate product is heated to a temperature sufficient to at least partially, and preferably fully, melt the powder adhesive so that it flows around to encapsulate the filaments of the web adhesive and bonds to the web adhesive. For example, for a combination of Purbond™ HCM VN 555 powder and PA-1001 web, the heating temperature is between 65° C. and 70° C. It is critical that this heating step is conducted at a temperature greater than, or equal to, the melting temperature of the powder adhesive. Otherwise, the powder adhesive will not melt and, therefore, will not encapsulate and adhere to the web adhesive. Preferably, the heating step is conducted at a temperature slightly greater than (within 5° C.), or equal to, the melting temperature of the powder adhesive. This prevents any inadvertent low temperature curing of the powder adhesive. It is also critical that this heating step is conducted below the typical curing temperature of the powder adhesive. Curing results in a hardened and infusible mass that is virtually useless as an adhesive. It is not critical, but it is certainly preferred, to utilize a heating temperature below the melting temperature of the web adhesive. Otherwise, the web adhesive will melt along with the powder adhesive forming a liquid composition that is difficult to process by conventional manufacturing techniques, such as belt lamination.

Optionally, the intermediate product may be subjected to pressure to enhance infiltration of the powder adhesive into the web adhesive's fibers. Pressure can be provided by any known means such as a press or pinch rolls.

The intermediate product is then cooled to solidify the melted powder adhesive and to set the bonds of the powder adhesive to the web adhesive. The result is an adhesive composition comprising a thermosetting powder adhesive that is adhered to a thermoplastic non-woven web adhesive.

Figure 1:
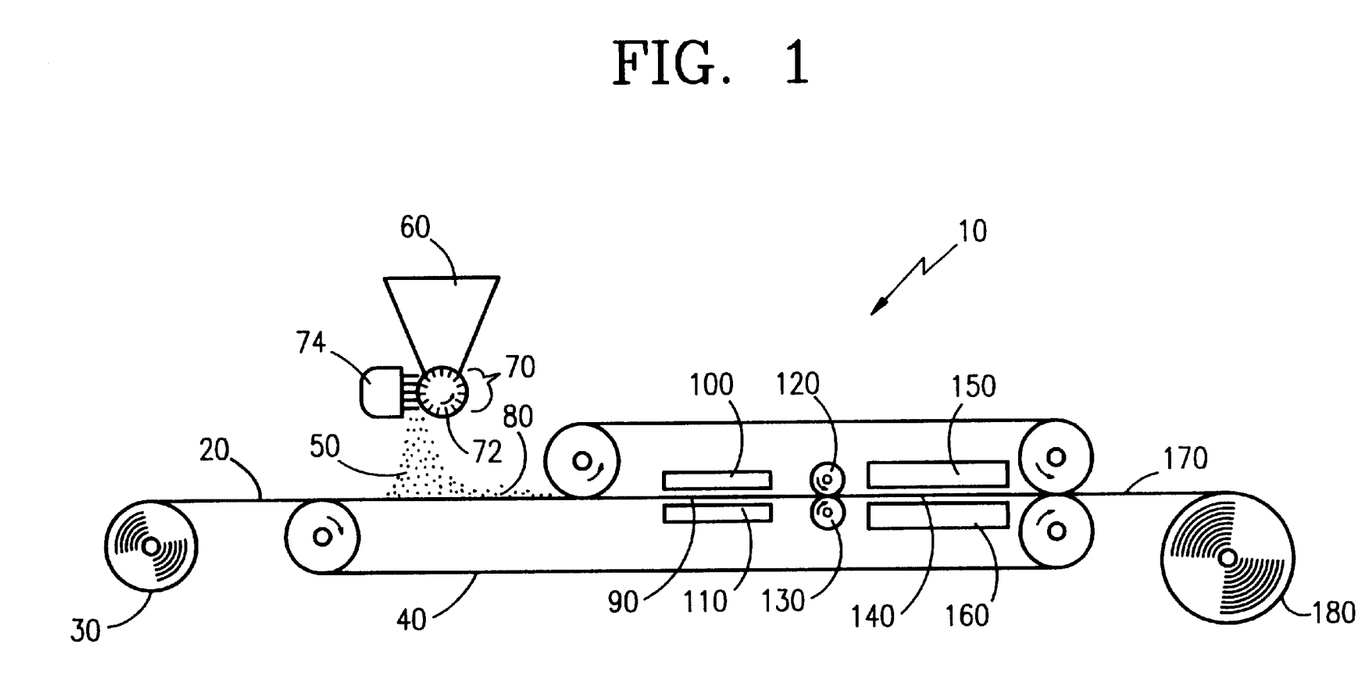
FIG. 1 is a schematic representation of a belt laminator for use in preparing an adhesive composition in accordance with the instant invention.

FIG. 1 is a schematic representation of a belt laminator 10 useful in preparing the adhesive composition. In FIG. 1, a sheet of thermoplastic non-woven web adhesive 20 is unrolled horizontally from a web adhesive supply roll 30 onto a belt 40. A thermosetting powder adhesive 50 is then applied onto an exposed surface of the web adhesive 20. Application of the powder adhesive 50 is accomplished by pouring the powder adhesive 50 from a feed hopper 60 into a flow and distribution device 70, such as a pitted roller 72 with vibrating brush 74. The flow and distribution device 70 serves to dispense the powder onto the web adhesive 20 at a controlled rate. For example, if the flow and distribution device comprises a pitted roller 72 with vibrating brush 74, the rate of powder distribution can be controlled by varying the speed of the pitted roller 72 and/or the speed of the vibrating brush 74. Alternatively, the powder adhesive 50 can be applied using a star valve as the flow and distribution device, or can be applied directly from the feed hopper 60 onto the web adhesive 20. The resulting assemblage is an intermediate product 80 comprising the web adhesive 20 and the loose powder adhesive 50.

The intermediate product 80 is then passed through a heating zone 90 where it is heated by heating elements 100 and 110 to a temperature slightly greater than or equal to the melting temperature of the powder adhesive 50 but less than the curing temperature of the powder adhesive 50 and the melting temperature of the web adhesive 20. Generally, a temperature of 70° C. is satisfactory. Heating elements 100 and 110 can be selected from a wide variety of heating devices known in the art including conductive, convective and radiant heating devices. However, conductive heating devices that operate using indirect heat exchange mechanisms are preferred.

Next, pressure is applied to the intermediate product 80 by passing the intermediate product 80 between pinch rolls 120 and 130. Generally, pinch rolls 120 and 130 are calibrated to exert a pressure on the intermediate product 80 of approximately 6 N/cm².

Finally, the intermediate product 80 is cooled in a cooling zone 140 by cooling means 150 and 160. Generally, cooling is conducted at a temperature of 15° C. to 25° C. Any cooling devices may be employed but, preferably, the cooling devices operate according to conductive heat exchange. The final product is a sheet of adhesive composition 170 which is wound into a roll by adhesive take-up roll 180.

The adhesive composition produced according to the instant invention is useful in binding together incompatible materials. Incompatible materials are bound by simultaneously contacting each material to be bound with the adhesive composition and then heating the adhesive composition to a temperature equal to or greater than the curing temperature of the powder adhesive component. Generally, temperatures greater than or equal to 140° C. will suffice. This serves to melt the thermoplastic web adhesive component and adhere it to both materials. Simultaneously, the thermosetting powder adhesive component will melt, adhere to both materials, and set into a hard, infusible, insoluble, cured product. The adhesive composition is then cooled to allow the thermoplastic web adhesive component to set into a fusible product.

A wide variety of materials can be bonded by the adhesive composition of the instant invention. In example, cloth and/or vinyl may be bound to each other and to metal, plastic, rubber and/or wood. As used herein, the word "vinyl" covers any of the polyvinyl resins and polymers (e.g. vinyl plastics) derived by the polymerization or copolymerization of vinyl monomers having the formula $CH_2CHR$ wherein R may be any functionality. Acceptable vinyl monomers include, but are not limited to, vinyl chloride, vinyl acetate, vinylidine chloride, acrylates such as methyl acrylate, methacrylates such as methyl methacrylate, acrylonitrile, styrene, and vinyl ethers.

The bonds formed by the adhesive composition between the two materials exhibit exceptionally high bond strength and heat resistance. For example, when an adhesive composition formed from Purbond™ HCM VN 555 powder and PA-1001 web is used to bond vinyl and ABS rubber, the bond strength is at least 1 $N/cm^2$ and may be higher than the point of structural failure for the bonded vinyl and/or ABS. Furthermore, the same bonded vinyl and ABS composite will exhibit a heat resistance ranging from 350° C. to 400° C.

II. Composite Article and Process of Making the Same

Alternatively, the adhesive composition can be manufactured and sold in combination with a material to which it is designed to be adherent as part of an adherable composite article.

Figure 2:
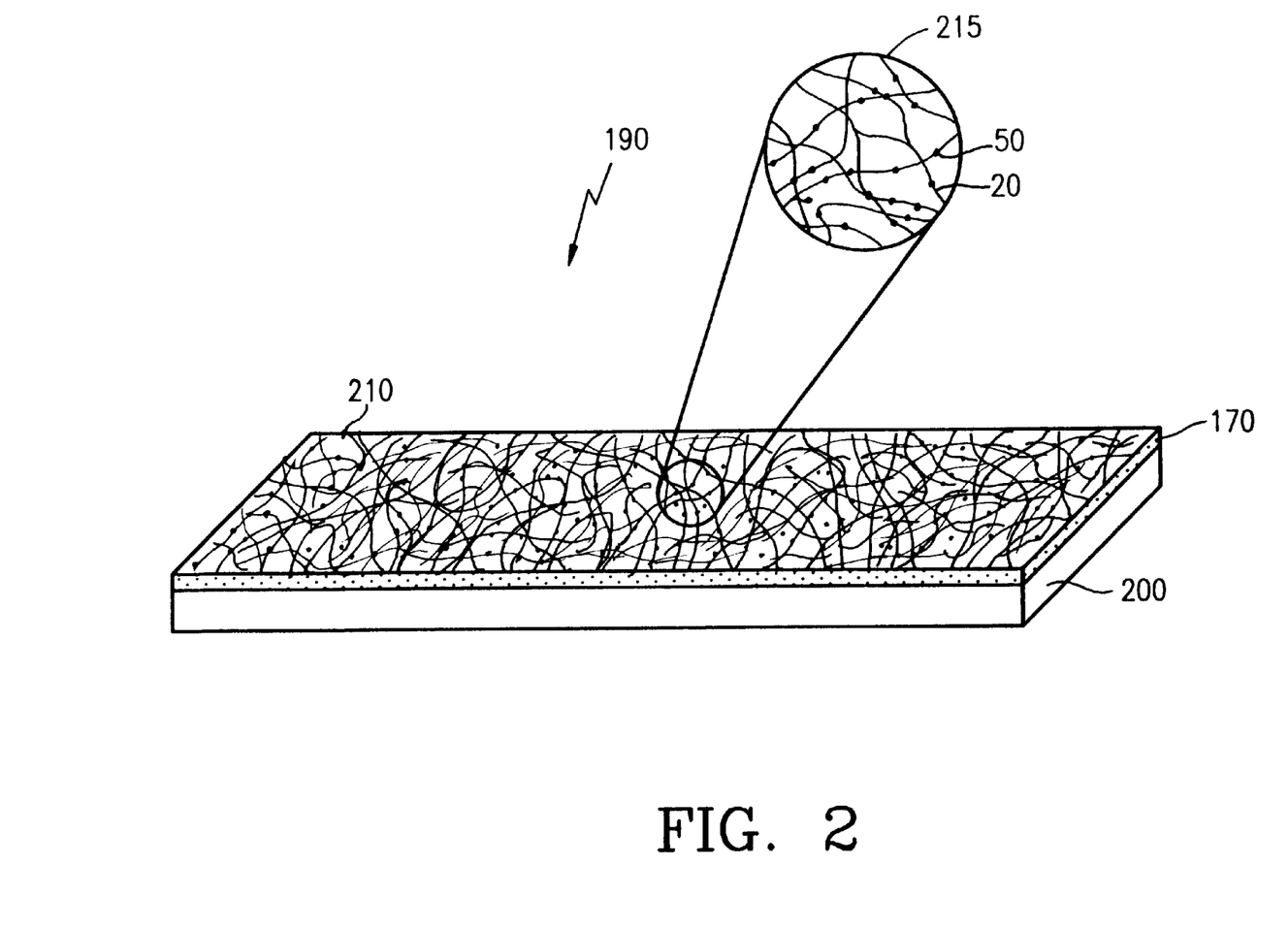
FIG. 2 illustrates an inventive composite article and, additionally, provides an expanded view of a circular section from the uppermost adhesive layer of said composite article.

FIG. 2 illustrates an inventive composite article 190. In FIG. 2, a substrate layer 200 is adhered to an adhesive layer 170 that is superimposed on one surface of the substrate layer 200. The adhesive layer 170 has an exposed adherent surface 210 on the side opposite the substrate layer 170. The adhesive layer 170 serves to bond the substrate layer 200 to a wide variety of application surfaces when the exposed adherent surface 210 is contacted to the application surfaces.

FIG. 2 also comprises an expanded view 215 of a circular portion of the adhesive layer 170 of the composite article 190. The expanded view 215 shows that the adhesive layer 170 comprises a thermosetting powder 50 impregnated in, and bound to, the fibers of a thermoplastic non-woven web 20.

The substrate layer may be any of a wide variety of flexible materials. Cloth and vinyl are the most evident examples. Preferably, the substrate layer is in the form of a sheet material so that it can be processed using typical large scale manufacturing techniques such as belt lamination.

The adhesive layer is actually synthesized on top of the substrate layer rather than applied to the substrate layer as a preformed product. This is accomplished by first layering a thermoplastic non-woven web adhesive onto one surface of the substrate layer.

Next, while the substrate layer and the web adhesive remain in contact, they are heated to a temperature sufficient to melt the web adhesive and, thereby, adhere the web adhesive to the substrate layer. In general, this step can be accomplished by using temperatures ranging anywhere from 95° C. to 135° C. Optionally, the substrate and web adhesive are also subjected to pressure. Pressure can be provided by any known means such as a press or pinch rolls. The substrate and web adhesive are then cooled to set the bonds of the web adhesive to the substrate. The result is a first intermediate product comprising a substrate layer and an adhered adhesive consisting of a thermoplastic non-woven web adhesive.

The web adhesive is then contacted with a thermosetting powder adhesive to form a second intermediate product. The second intermediate product comprises a substrate layer and an adhered adhesive layer comprising an adhered web adhesive component and a loose powder adhesive component. This step is easily accomplished by sprinkling powder adhesive onto an exposed surface of the web adhesive. The powder adhesive sits loosely on the application surface. In addition, because of the open nature of the web adhesive, the powder adhesive penetrates through the fibers of the web adhesive and sits directly on the substrate.

The second intermediate product is heated at a temperature sufficient to at least partially, and preferably fully, melt the powder adhesive so that it flows on the filaments of the web adhesive and bonds to the web adhesive. The temperature utilized should be greater than (preferably within 5° C.), or equal to, the melting temperature of the powder adhesive but less than the curing temperature of the powder adhesive and the melting temperature of the web adhesive. Generally, this step can be conducted at a temperature between 65° C. and 95° C.

Optionally, the second intermediate product is also subjected to pressure to enhance infiltration of the powder adhesive into the web adhesive's fibers. Pressure can be provided by any known means such as a press or pinch rolls.

The second intermediate product is then cooled to solidify the melted powder adhesive and set the bonds of the powder adhesive to the web adhesive. The result is a composite article comprising a substrate layer and an adhesive layer bound to a surface of the substrate layer. The adhesive layer comprises a thermosetting powder adhesive component that is impregnated in, and adhered to, a thermoplastic nonwoven web adhesive component.

Figure 3:
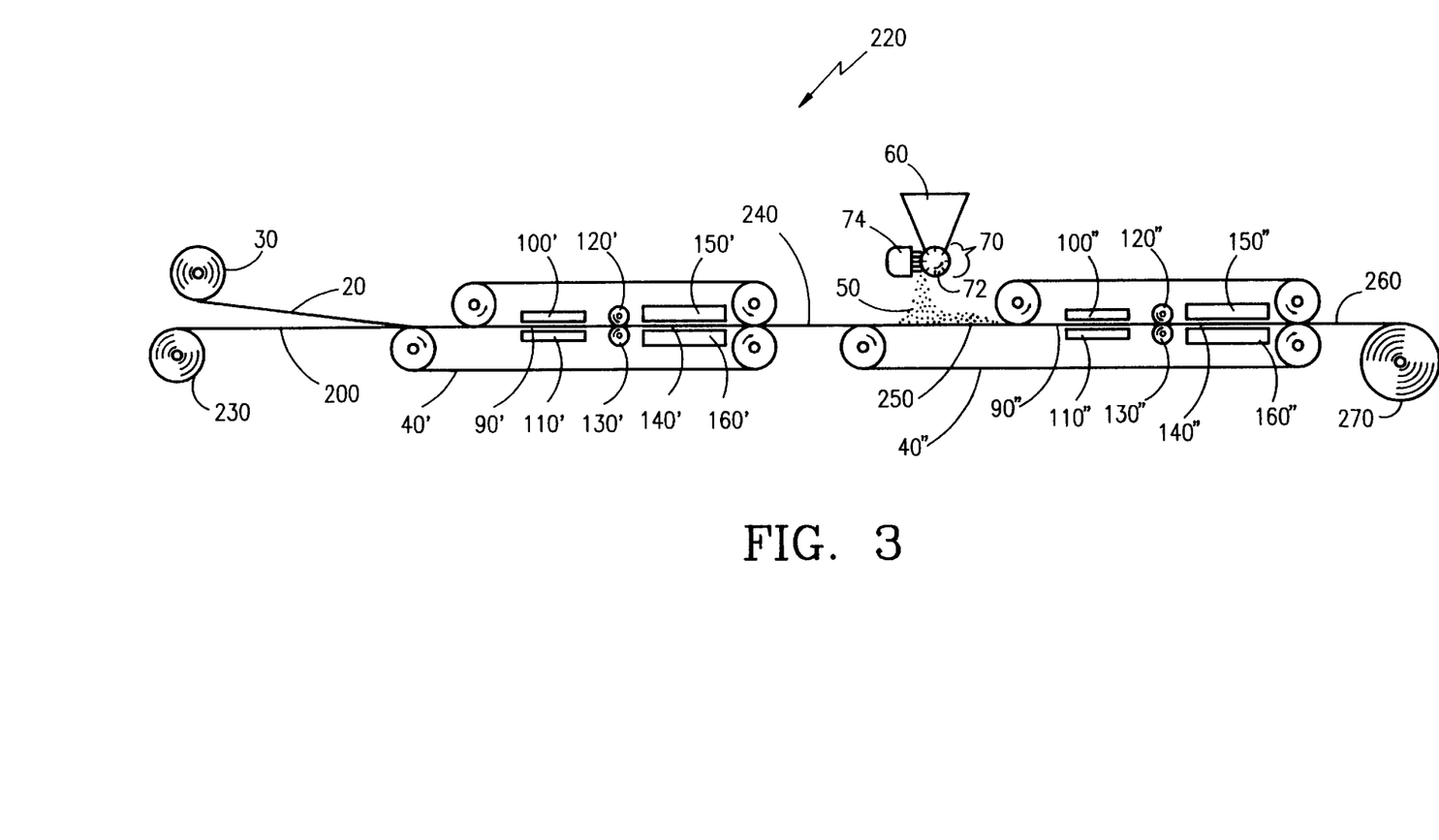
FIG. 3 shows a belt laminator for use in producing an inventive composite article.

FIG. 3 shows a belt laminator 220 for use in preparing the composite article. In FIG. 3, a sheet of substrate 200, such as vinyl or cloth sheet, is fed along a horizontal plane onto a belt 40' from a substrate supply roll 230. A sheet of thermoplastic non-woven web adhesive 20 is then unwound along a horizontal plane and layered onto an exposed surface of the substrate 200 from a web adhesive supply roll 30.

The web adhesive 20 and substrate 200 are then passed, in combination, through heating zone 90' where they are heated by heating elements 100' and 110' to a temperature greater than or equal to the melting temperature of the web adhesive. Generally, a temperature of 120° C. will suffice. Heating elements 100' and 110' can be selected from a wide variety of heating devices known in the art including conductive, convective and radiant heating devices, however, conductive heating devices that operate using indirect heat exchange mechanisms are preferred.

Next, pressure is applied to the web adhesive 20 and substrate 200 by passing them between pinch rolls 120' and 130'. Generally, pinch rolls 120' and 130' are calibrated to exert a pressure of approximately 6 N/cm².

The web adhesive 20 and substrate 200 are then cooled in a cooling zone 140' by cooling means 150' and 160'. Generally, cooling is conducted at a temperature of 15° C. to 25° C. A variety of cooling mechanisms may be employed, however, cooling mechanisms that operate using an indirect heat exchange mechanism are preferred.

The result is the formation of a first intermediate product 240 comprising a substrate layer and an adhered web adhesive layer. This first intermediate product is passed onto belt 40" where a thermosetting powder adhesive 50 is applied onto the web adhesive layer of the first intermediate product 240. Application of the powder adhesive 50 is accomplished by pouring the powder adhesive 50 from a feed hopper 60 into a flow and distribution device 70, such as a pitted roller 72 and vibrating brush 74. The flow and distribution device 70 then dispenses the powder adhesive 50 onto the web adhesive layer of the first intermediate product 240 at a controlled rate. For example, if the flow and distribution device comprises a pitted roller 72 with vibrating brush 74, the rate of powder distribution can be controlled by varying the speed of the pitted roller 72 and/or the speed of the vibrating brush 74. Alternatively, the powder adhesive 50 can be applied using a star valve as the flow and distribution device, or can be applied directly from the feed hopper 60 onto the web adhesive layer of the first intermediate product 240. The resulting assemblage is a second intermediate product 250 comprising a substrate layer and an adhered web adhesive layer containing loose powder adhesive.

The second intermediate product 250 is then passed through a second heating zone 90" where it is heated by heating elements 100" and 110" to a temperature slightly greater than or equal to the melting temperature of the powder adhesive 50 but less than the curing temperature of the powder adhesive 50 and the melting temperature of the web adhesive 20. Generally, a temperature of 70° C. is satisfactory. Heating elements 100" and 110" can be selected from a wide variety of heating devices known in the art including conductive, convective and radiant heating devices. However, conductive heating devices that operate using an indirect heat exchange mechanisms are preferred.

Next, pressure is applied to the second intermediate product 250 by passing the second intermediate product 250 between pinch rolls 120" and 130". Generally, pinch rolls 120" and 130" are calibrated to exert a pressure on the second intermediate product 250 of approximately 6 N/cm².

Finally, the second intermediate product 250 is cooled in a second cooling zone 140" by cooling means 150" and 160". Generally, cooling is conducted at a temperature of 15° C. to 25° C. A variety of cooling mechanisms may be employed, however, cooling mechanisms that operate using an indirect heat exchange mechanism are preferred. The final product is a sheet of the composite article 260 that is rolled by a composite article take-up roll 270.

The composite article of this invention can be bound to a variety of application surfaces to provide a protective or decorative cover thereon. Suitable application surfaces include vinyl, cloth, metal, plastic, rubber, and wood. The composite article is bound by contacting the exposed adherent surface of the adhesive layer to the application surface. Then, while still contacting the application surface, the composite article is heated to a temperature equal to or greater than the curing temperature of the powder adhesive component in the adhesive layer, Generally, temperatures greater than or equal to 140° C. will suffice. This temperature should serve to melt the thermoplastic web adhesive component of the adhesive layer and adhere the layer to the application surface. Simultaneously, the thermosetting powder adhesive component of the adhesive layer will melt, adhere to the application surface, and set into a hard, infusible, insoluble, cured product. The composite article is then cooled to allow the thermoplastic web adhesive component to set into a fusible product.

The bonds formed exhibit high bond strength and heat resistance. For example, a composite article comprising a vinyl substrate layer and an adhesive layer of Purbond™ HCM VN 555 powder in combination with PA-1001 web, forms a bond with ABS rubber that has a bond strength of at least 1 N/cm² and that may be higher than the point of structural failure for the bonded vinyl and/or ABS. Furthermore, the same composite exhibits a heat resistance ranging from 350° C. to 400° C.

Although generally the composite article employs only one adhesive layer, two or more adhesive layers can be utilized. The use of multiple adhesive layers is necessary when the adhesive layer of the composite article is incompatible with the desired application surface. Incompatibility in the adhesive is usually due to the use of an incompatible thermoplastic non-woven web adhesive component. In order to rectify this problem, one or more additional thermoplastic non-woven web adhesive components are laminated onto the adhesive layer. The additional web adhesives are compatible with the first web adhesive but contain enough structural differences to also make them compatible with the desired application surface. Thermosetting powder adhesive is then adhered to the additional web adhesives.

Figure 4:
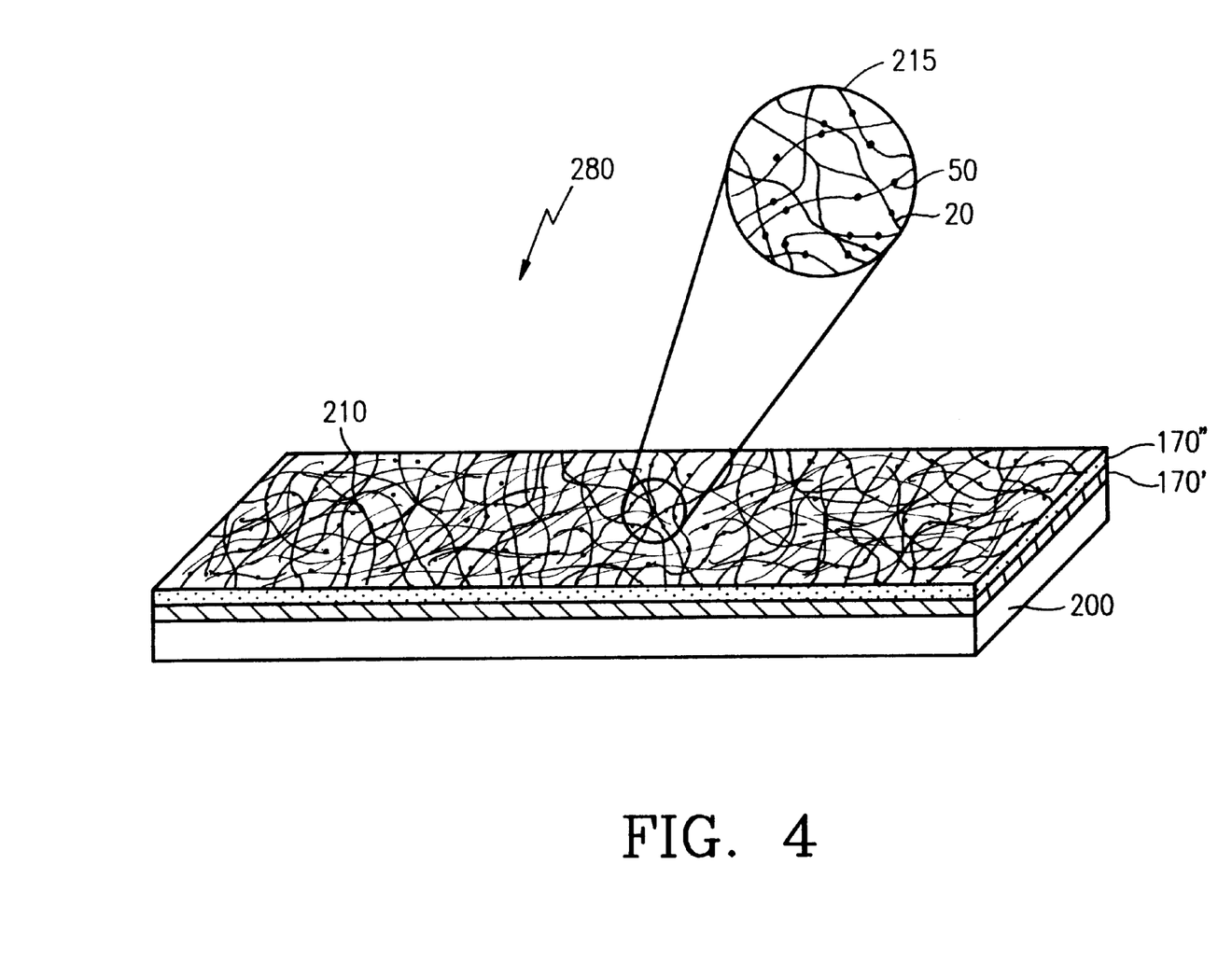
FIG. 4 is a representation of a composite article according to the instant invention that comprises multiple adhesive layers and, additionally, provides an enlarged view of a circular section from the uppermost adhesive layer of said composite article.

FIG. 4 shows a composite article 280 that has multiple adhesive layers. In FIG. 4, a substrate layer 200 is adhered to a first adhesive layer 170' that has been superimposed on one surface of the substrate layer 200. The first adhesive layer 170' is adhered to a second adhesive layer 170" that has been superimposed on the side of the first adhesive layer 170' that is opposite the substrate layer 200. The second adhesive layer 170" has an exposed adherent surface 210 on the side opposite the first adhesive layer 170'. This exposed adherent surface 210 serves as the point for adhering the composite article 280 to various application surfaces. The adhesive layers 170' and 170" are identical with the exception that each adhesive layer contains a different thermoplastic non-woven web adhesive component.

FIG. 4 also comprises an expanded view 215 of a circular portion of the adhesive layer 170" of the composite article 190. The expanded view 215 shows that the adhesive layer 170" comprises thermosetting powder 50 impregnated in, and bound to, the fibers of a thermoplastic non-woven web 20.

Figure 5:
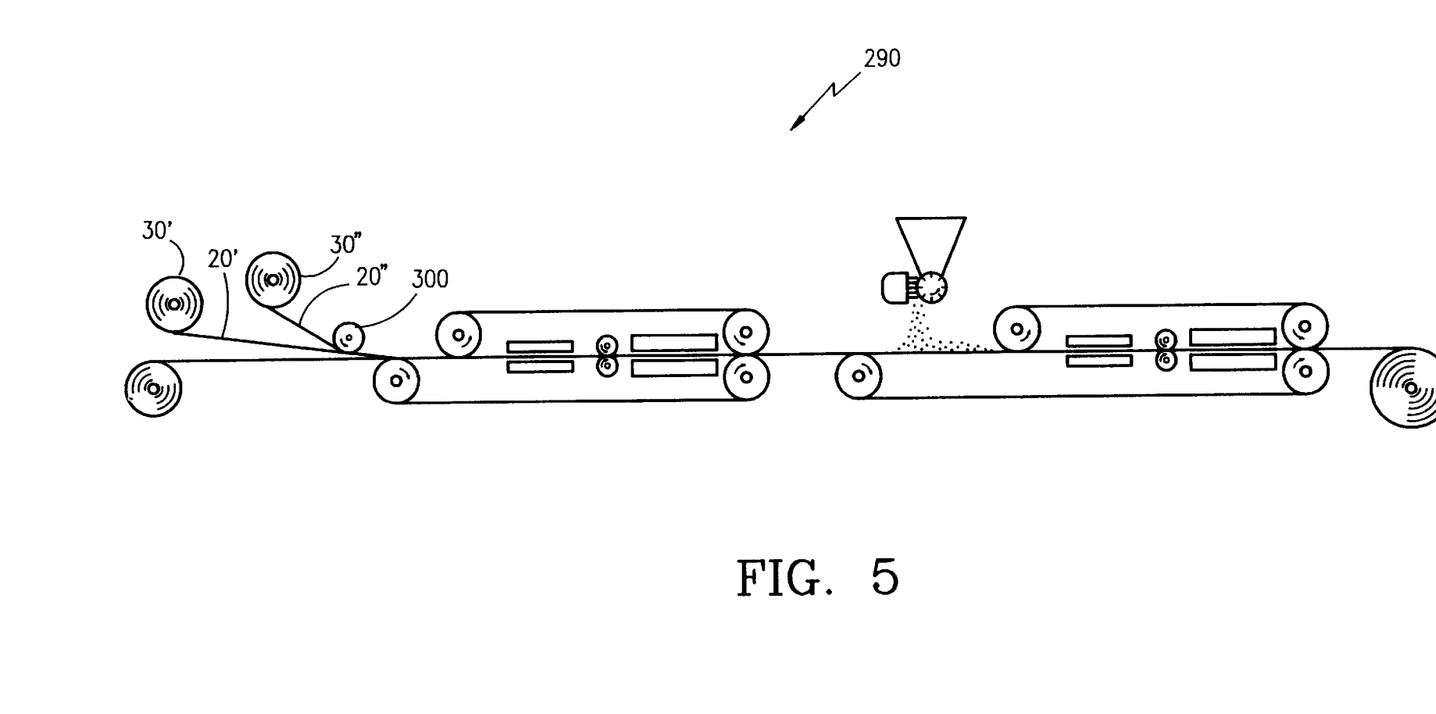
FIG. 5 visually details a belt laminator for use in preparing an inventive composite article comprising multiple adhesive layers.

FIG. 5 illustrates a belt laminator 290 for use in preparing a composite article having multiple adhesive layers. In belt laminator 290, two sheets of web adhesive 20' and 20" are unrolled from two web adhesive rolls 30' and 30", respectively. The first web adhesive 20' is adherent to the substrate layer. The second web adhesive 20" is adherent to both first web adhesive 20' and the application surface to which the composite article is to be bonded. The two web adhesives, 20' and 20", are pressed together prior to applying either web adhesive to the substrate by a pinch roll 300. In all other respects the belt laminator 290 is identical to the belt laminator 220 in FIG. 3.

While the invention has been described in conjunction with the specific embodiments outlined above, it is evident that many alternatives, modifications, and variations will be apparent to those skilled in the art. Accordingly, the preferred embodiments of the invention are intended to be illustrative and not limiting. Various changes may be made without departing from the spirit and scope of the invention as defined in the following claims.

I claim:

1. An adhesive composition comprising a thermosetting powder adhesive that exhibits a curing temperature higher than its melting temperature adhered to a thermoplastic non-woven web adhesive that exhibits a melting temperature higher than the melting temperature of the thermosetting powder adhesive.

2. The adhesive composition of claim 1 wherein the thermosetting powder adhesive is made from a polyester-polyurethane and has a melting temperature between 65° C. and 95° C., and wherein the thermoplastic non-woven web adhesive is a sheet or slitted film that is made from a material selected from the group consisting of ethylene-vinyl acetate copolymers, polyesters, polyolefins, and polyamides.

3. The adhesive composition of claim 1 wherein, the thermosetting powder adhesive has a melting temperature between 65° C. and 95° C. and a curing temperature greater than or equal to 140° C., and wherein the thermoplastic non-woven web adhesive is a sheet or slitted film with a melting temperature between 95° C. and 135° C.

4. A composite article comprising the following components: (a) a substrate layer; and (b) an adhesive layer bound to a surface of the substrate layer comprising a thermosetting powder adhesive component that exhibits a curing temperature higher than its melting temperature adhered to one or more thermoplastic non-woven web adhesive components) that exhibit(s) a melting temperature higher than the melting temperature of the thermosetting powder adhesive component.

5. The composite article of claim 4 wherein the substrate layer is made of vinyl or cloth, wherein thermosetting powder adhesive component in the adhesive layer has a melting temperature between 65° C. and 95° C. and is made from a polyester-polyurethane, and wherein the thermoplastic non-woven web adhesive component in the adhesive layer is a sheet or slitted film made from a material selected from the group consisting of ethylene-vinyl acetate copolymers, polyesters, polyolefins, and polyamides.

6. The composite article of claim 4, wherein the substrate layer is made of vinyl or cloth, wherein thermosetting powder adhesive component in the adhesive layer has a melting temperature between 65° C. and 95° C. and a curing temperature greater than or equal to 140° C., and wherein the thermoplastic non-woven web adhesive component in the adhesive layer is a sheet or slitted film with a melting temperature between 95° C. and 135° C.

* * * * *

UNITED STATES PATENT AND TRADEMARK OFFICE
CERTIFICATE OF CORRECTION

PATENT NO. : 6,136,732
DATED : October 24, 2000
INVENTOR(S) : Tushar Patel

It is certified that error appears in the above-identified patent and that said Letters Patent is hereby corrected as shown below:

Title page,
Column 1,
After Assignee, delete "E.R. Technologies"; substitute "H.R. Technologies".

Signed and Sealed this

Thirteenth Day of November, 2001

Attest:

*Nicholas P. Godici*

NICHOLAS P. GODICI
*Attesting Officer*   *Acting Director of the United States Patent and Trademark Office*